United States Patent [19]
Ho

[11] Patent Number: 5,676,001
[45] Date of Patent: Oct. 14, 1997

[54] ANTI-THEFT DEVICE FOR VEHICLE

[76] Inventor: Tien-Chin Ho, 19, Sub-Lane 24, Lane 8, Der-Yang 2nd Street, Ho-Bi Village, Zen-Der Hsiang, Tainan Hsien, Taiwan

[21] Appl. No.: 685,849

[22] Filed: Jul. 24, 1996

[51] Int. Cl.$^6$ ................................................. B60R 25/02
[52] U.S. Cl. ................................................. 70/209; 70/226
[58] Field of Search ........................... 70/209, 225, 226, 70/227, 237, 238

[56] References Cited

U.S. PATENT DOCUMENTS

| | | | |
|---|---|---|---|
| 5,199,284 | 4/1993 | Lin | 70/209 |
| 5,275,030 | 1/1994 | Cole | 70/209 |
| 5,353,614 | 10/1994 | Anderson | 70/209 |
| 5,415,018 | 5/1995 | Ferrante | 70/209 |
| 5,454,240 | 10/1995 | Whitney | 70/209 |
| 5,513,506 | 5/1996 | Ricalde | 70/209 |
| 5,537,847 | 7/1996 | Dalton et al. | 70/209 |
| 5,540,067 | 7/1996 | Kim | 70/209 |
| 5,555,754 | 9/1996 | Ferrante | 70/209 |

*Primary Examiner*—Steven M. Meyers
*Assistant Examiner*—Donald J. Lecher
*Attorney, Agent, or Firm*—Larson and Taylor

[57] ABSTRACT

An anti-theft device includes a casing engaged onto a steering wheel of a vehicle for preventing the steering wheel from being rotated and for protecting the air bag from being stolen. The casing includes a groove and one or more apertures distal to the flange. A stick includes a head formed in one end. A core is engaged in the head and has a latch for engaging with the aperture so as to lock the stick to the casing. An elbow is secured to the head and may engage with the steering wheel when the latch of the core is engaged with the aperture so as to lock the casing and the stick to the steering wheel.

1 Claim, 4 Drawing Sheets

ANTI-THEFT DEVICE FOR VEHICLE

BACKGROUND OF THE INVENTION

1. Field of the Invention

The present invention relates to an anti-theft device, and more particularly to an anti-theft device for vehicles.

2. Description of the Prior Art

Various kinds of typical anti-theft devices have been developed for locking the steering wheels in place. However, the anti-theft devices may not lock the air bag which is received in the center portion of the steering wheel.

The present invention has arisen to mitigate and/or obviate the afore-described disadvantages of the conventional anti-theft devices.

SUMMARY OF THE INVENTION

The primary objective of the present invention is to provide an anti-theft device which may be used for locking the air bag in place.

The other objective of the present invention is to provide an anti-theft device which may be engaged with steering wheels of different sizes.

In accordance with one aspect of the invention, there is provided an anti-theft device for engaging onto a steering wheel of a vehicle, the anti-theft device comprises a casing for engaging onto the steering wheel, the casing including a flange extended radially inward therefrom for engaging with the steering wheel so as to prevent the casing from disengaging from the steering wheel, the casing including a groove and at least one aperture formed therein distal to the flange, the aperture being arranged beside the groove, a stick including an end portion having a head formed thereon, the head including a core provided therein, the core including a latch extendible outward of the head for engaging with the aperture so as to lock the stick to the casing, and an elbow including a stud solidly secured to the head and moved in concert with the stick, the elbow being provided for engaging with the steering wheel when the latch of the core is engaged with the aperture so as to lock the casing and the stick to the steering wheel.

The elbow includes a rectangular bar slidably engaged in the groove so as to prevent the elbow from rotating relative to the casing.

The groove includes a first end having an opening of larger diameter formed therein and located closer to the flange, the bar of the elbow includes a size slightly smaller than that of the opening for allowing the bar to be rotated within the opening and for allowing the elbow to be disengaged from the casing via the groove.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
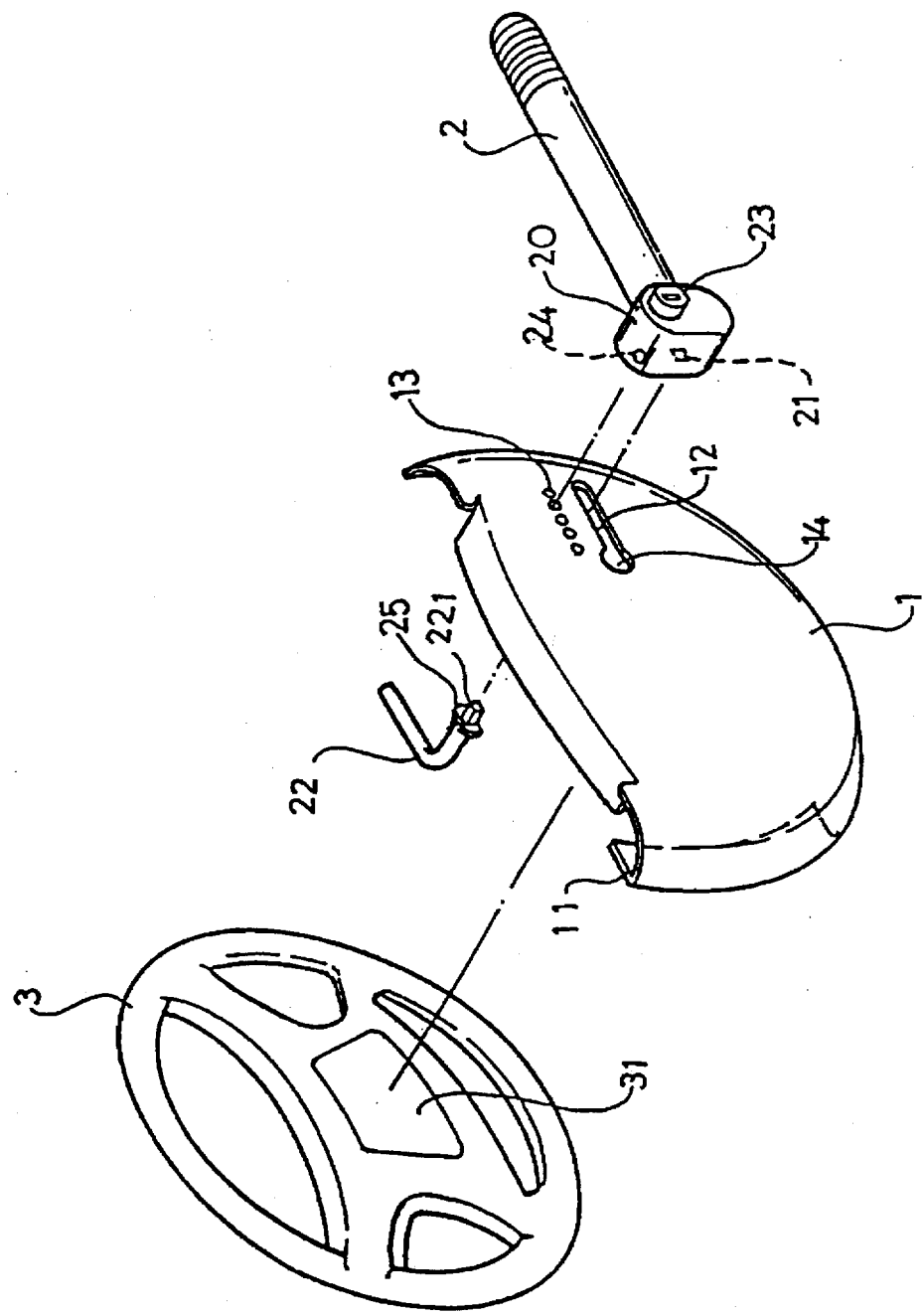
FIG. 1 is an exploded view of an anti-theft device in accordance with the present invention.

Referring to the drawings, and initially to FIGS. 1–4, an anti-theft device in accordance with the present invention comprises a casing 1 for engaging onto the steering wheel 3 which includes an air bag 31 received in the middle portion thereof such that the air bag 31 may be protected by the casing 1. The casing 1 includes a flange 11 extended radially inward from the peripheral portion for engaging with the steering wheel 3 so as to prevent the casing 1 from disengaging from the steering wheel 3. The casing 1 includes a groove 12 and a number of apertures 13 formed therein distal to the flange 11. The apertures 13 are arranged beside the groove 12. The groove 12 includes an opening 14 of larger diameter formed in one end thereof and closer to the flange 11.

A stick 2 includes an enlarged head 20 formed on one end thereof. The head 20 includes a hole 21 formed therein and includes a core 23 secured therein. The core 23 includes a latch 24 extendible outward of the head 20 for engaging with either of the apertures (FIG. 4) so as to lock the stick 2 to the casing 1. An elbow 22 includes a stud 221 engaged in the hole 21 of the head 20 and secured to the head 20 by such as welding process such that the elbow 22 is solidly secured to the stick 2. The elbow 22 includes a bar 25 having a rectangular shape and having a size corresponding to that of the groove 12 so as to limit the sliding movement of the bar 25 along the groove and so as to prevent the bar 25 from rotating relative to the casing 1. The bar 25 includes a size slightly smaller than that of the opening 14 such that the bar 25 may be rotated within the opening 14. The elbow 22 may be engaged through the groove 12 by engaging the bar 25 through the opening 14.

Figure 2:
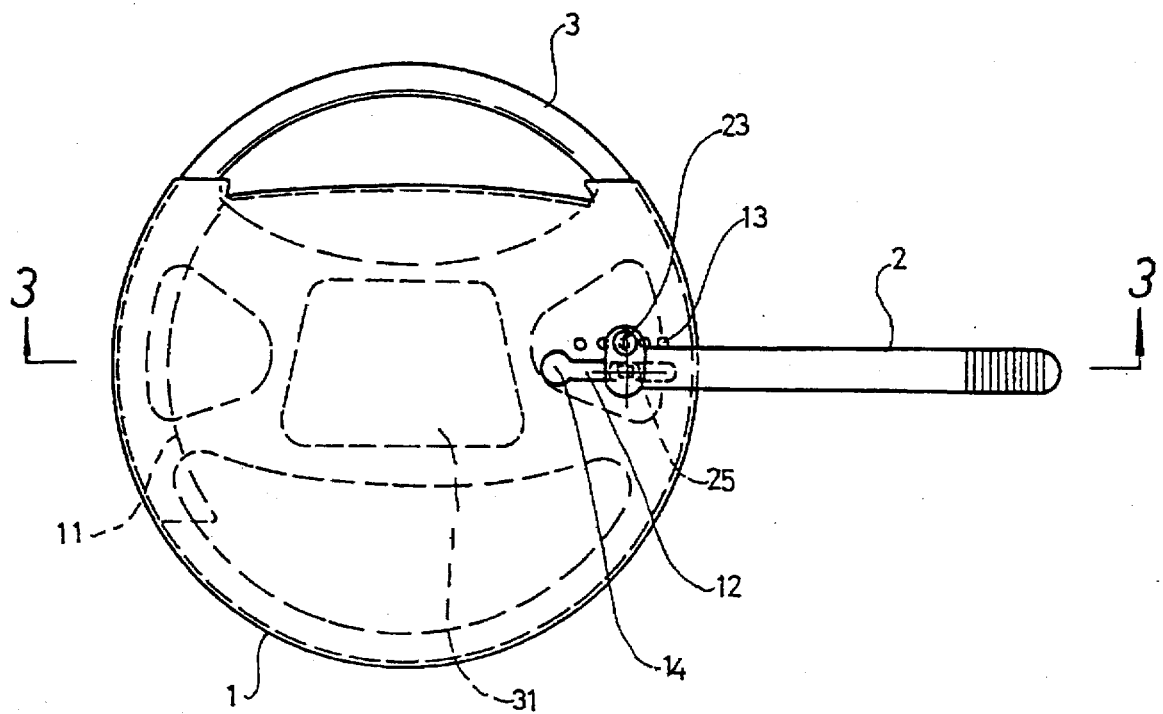
FIG. 2 is a top view of the anti-theft device.
Figure 3:
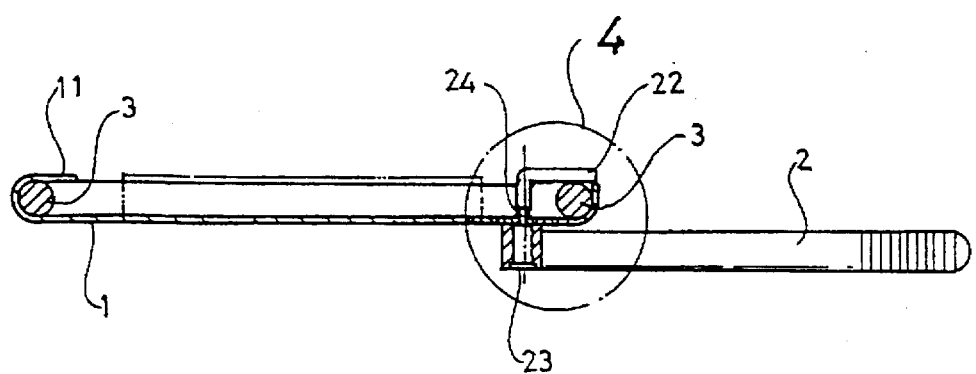
FIG. 3 is a cross sectional view taken along lines 3—3 of FIG. 2.
Figure 4:
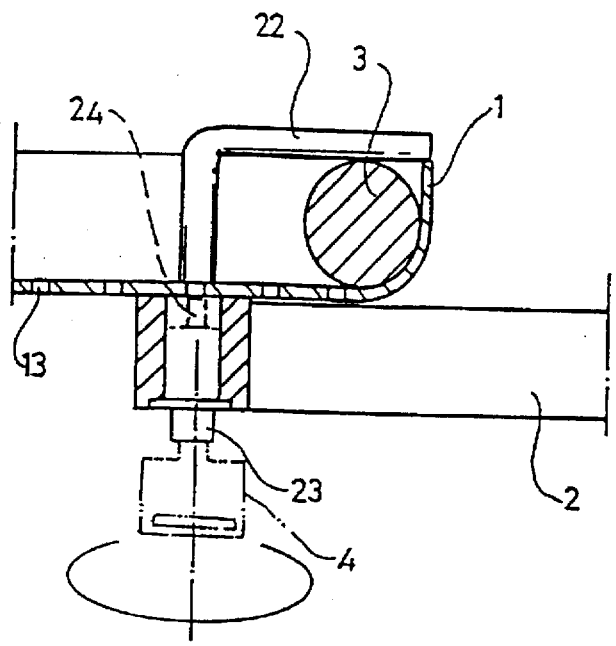
FIG. 4 is an enlarged partial cross sectional view of the anti-theft device.
Figure 5:
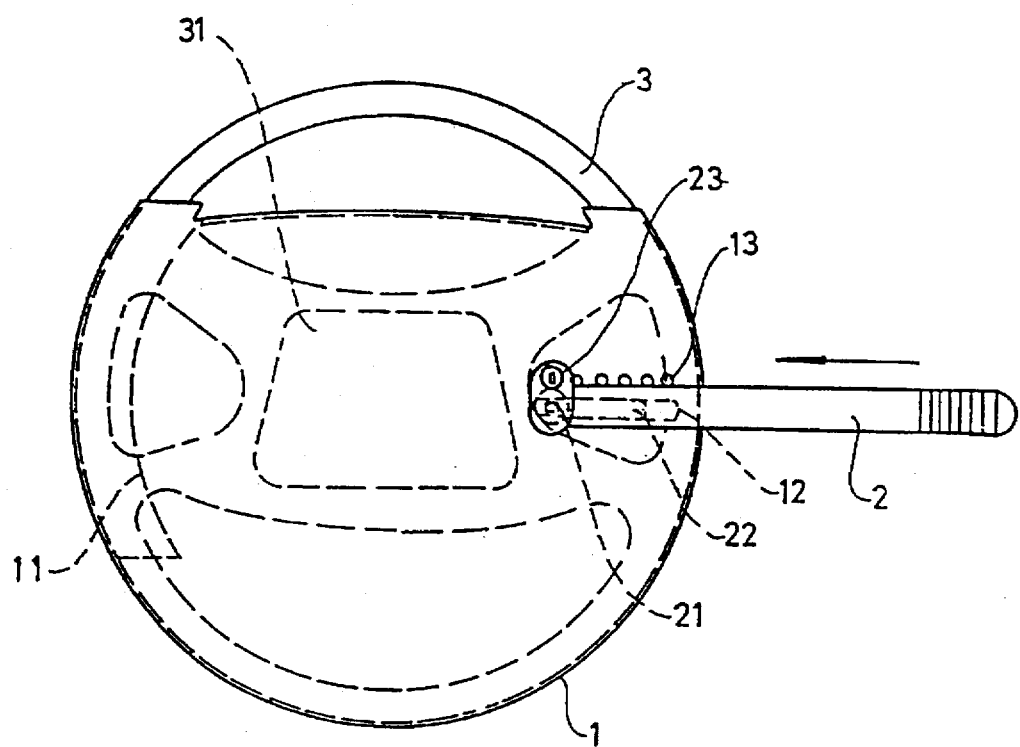
FIGS. 5 and 6 are top views of the anti-theft device, illustrating the operation of the anti-theft device.
Figure 6:
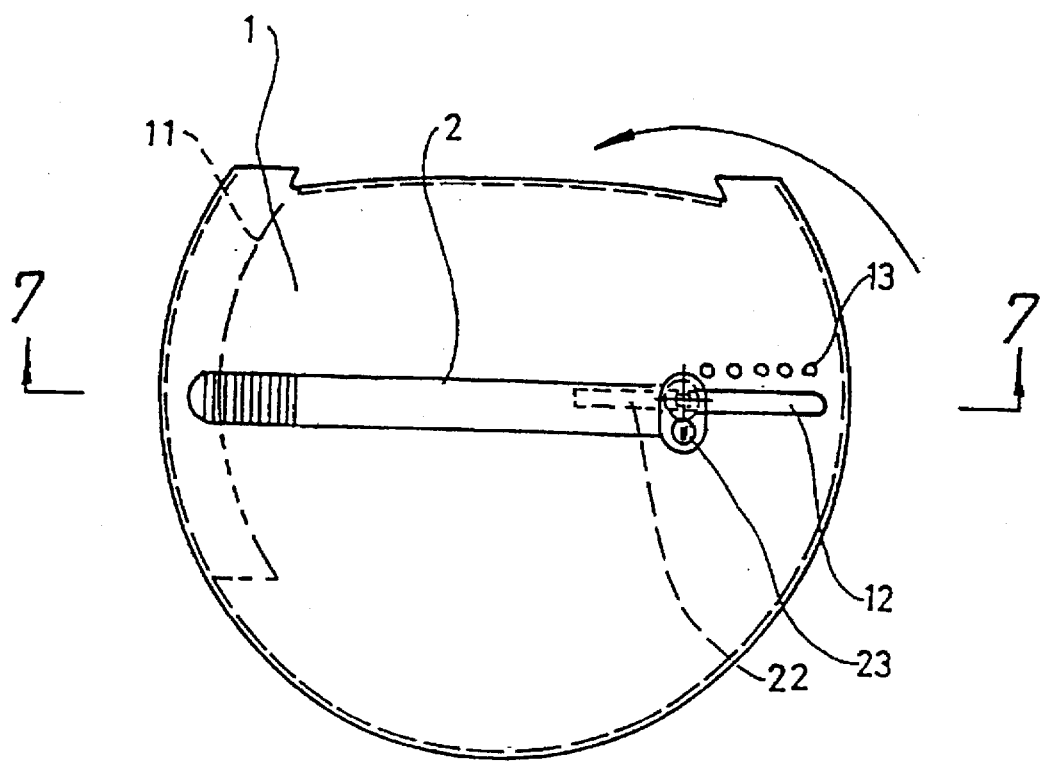
Figure 7:
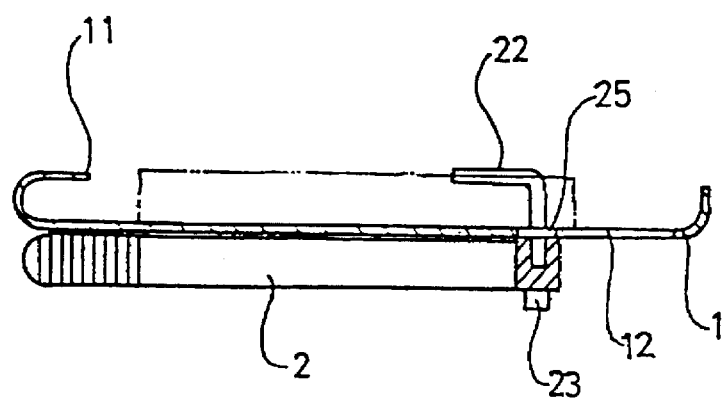
FIG. 7 is a cross sectional view taken along lines 7—7 of FIG. 6.

In operation, as shown in FIGS. 2 to 4, the elbow 22 may be engaged through the groove 12 and the bar 25 may be moved along the groove 12 until the latch 24 of the core 23 is engaged with either of the apertures 13. At this moment, the elbow 22 may be engaged with the steering wheel 3. The bar 25 may prevent the stick 2 and the elbow 22 from rotating relative to the casing 1. In addition, the stick 2 may prevent the steering wheel 3 from being rotated by the unauthorized person. As shown in FIG. 4, when a key 4 is engaged into the core 23 for disengaging the latch 24 from the aperture 13, the bar 25 may be moved to the opening 14 (FIG. 5) such that the elbow 22 and the stick 2 may be rotated to the folded position as shown in FIGS. 6 and 7.

It is to be noted that the latch 24 of the core 23 may be engaged with different aperture 13 so as to fit steering wheels of different sizes. In addition, the air bag 31 may be covered and protected by the casing 1 from being stolen.

Accordingly, the anti-theft device in accordance with the present invention includes an elbow slidably engaged in the casing for engaging with steering wheels of different sizes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-theft device for engaging onto a steering wheel of a vehicle, said anti-theft device comprising:

a casing for engaging onto said steering wheel, said casing including a flange extended radially inward therefrom for engaging with the steering wheel so as to prevent said casing from disengaging from the steering wheel, said casing including a groove and at least one aperture formed therein distal to said flange, said aperture being arranged beside said groove, said groove including a first end having an opening of larger diameter formed therein and located closer to said flange, a stick including an end portion having a head formed thereon, said head including a core provided therein, said core including a latch extendible outward of said head for engaging with said aperture so as to lock said stick to said casing, and an elbow including a stud solidly secured to said head and moved in concert with said stick, said elbow engaging with the steering wheel when said latch of said core is engaged with said aperture so as to lock said casing and said stick to the steering wheel, said elbow including a rectangular bar slidably engaged in said groove so as to prevent said elbow from rotating relative to said casing, said bar of said elbow including a size slightly smaller than that of said opening for allowing said bar to be rotated within said opening and for allowing said elbow to be disengaged from said casing via said groove.

\* \* \* \* \*